(12) United States Patent
Inagaki

(10) Patent No.: US 6,961,195 B2
(45) Date of Patent: Nov. 1, 2005

(54) MIRROR DEVICE FOR A VEHICLE

(75) Inventor: Bunji Inagaki, Aichi-ken (JP)

(73) Assignee: Kabushiki Kaisha Tokai-Rika-Kenki-Seisakusho, Aichi-Ken (JP)

(*) Notice: Subject to any disclaimer, the term of this patent is extended or adjusted under 35 U.S.C. 154(b) by 70 days.

(21) Appl. No.: 10/456,502

(22) Filed: Jun. 9, 2003

(65) Prior Publication Data
US 2003/0227699 A1 Dec. 11, 2003

(30) Foreign Application Priority Data
Jun. 11, 2002 (JP) ........................................ 2002-170424

(51) Int. Cl.[7] .............................................. G02B 7/182
(52) U.S. Cl. ........................ 359/900; 359/871; 359/872
(58) Field of Search ......................... 359/900, 871–878; 396/427, 544

(56) References Cited

U.S. PATENT DOCUMENTS 4,855,770 A * 8/1989 Mauchan et al. ........... 396/544

6,676,308 B2 * 1/2004 Baek .......................... 396/427

FOREIGN PATENT DOCUMENTS

| EP | 05294184    | 9/1993  |
| EP | 1 316 476 A2 | 6/2003  |
| JP | 5294184     | 11/1993 |
| JP | 6-12199 U   | 2/1994  |

OTHER PUBLICATIONS

French Preliminary Search Report dated Aug. 16, 2004.

* cited by examiner

Primary Examiner—Mohammad Sikder
(74) Attorney, Agent, or Firm—Nixon Peabody LLP

(57) ABSTRACT

In order that an image photographed by a monitoring mechanism can be stable even in a case in which vibration of a vehicle is transmitted to a hosing, a mirror device for a vehicle comprising a housing, provided at a vehicle, which holds a mirror and covers a back surface side of the mirror, a photographing mechanism, provided within the housing, which has a lens and photographs a status in a direction in which the lens is oriented, a fixing member, fixed to one of the housing or the mirror, which fixes one of the lens or the vicinity of the lens of the photographing mechanism, is provided.

14 Claims, 6 Drawing Sheets

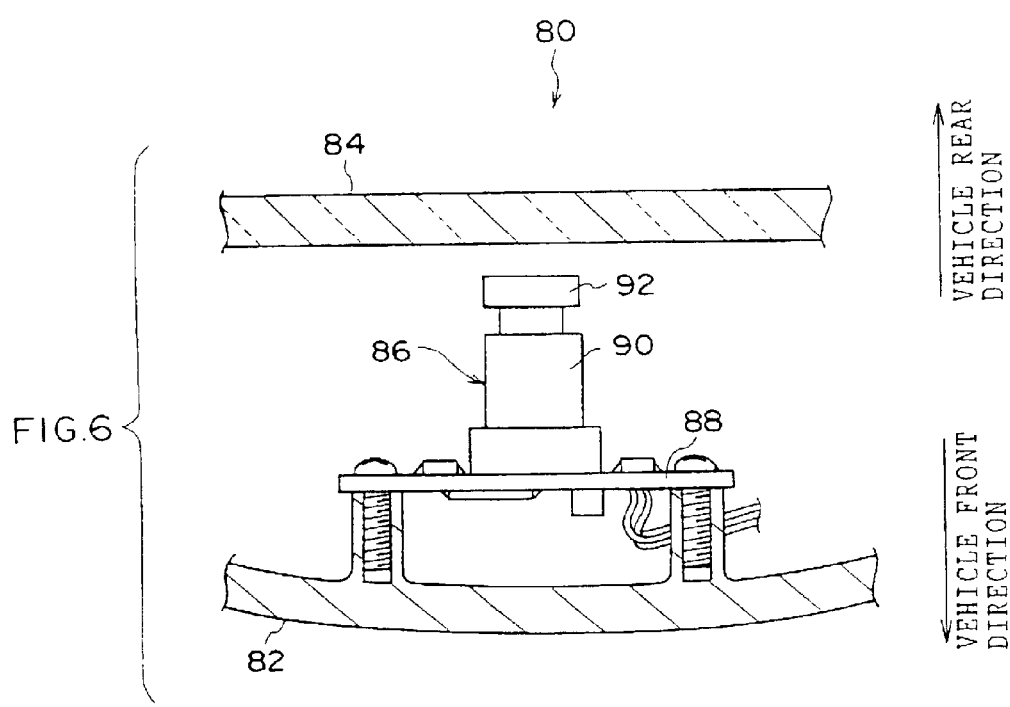

MIRROR DEVICE FOR A VEHICLE

CROSS-REFERENCE TO RELATED APPLICATION

This application claims priority under 35 USC 119 from Japanese Patent Application No. 2002-170424, the disclosure of which is incorporated by reference herein.

BACKGROUND OF THE INVENTION

1. Field of the Invention

The present invention relates to a mirror device for a vehicle, and in particular, to a mirror device for a vehicle provided with a photographing mechanism.

2. Description of the Related Art

For example, an inner mirror device for a vehicle 80 shown in FIG. 6 is provided with a housing 82. The housing 82 covers a back surface side of a mirror 84 for visualizing rearward and also holds the mirror 84.

A monitoring device 86 is provided within the housing 82. The monitoring device 86 includes a plate shaped PCB (a print circuit board) 88. The PCB 88 is fixed to the housing 82 at end portions of the PCB 88. A base end of a substantially pillar shaped device main body 90 of the monitoring device 86 is fixed to a central portion of the PCB 88. A lens 92 is provided at a tip end of the device main body 90. The lens 92 is oriented toward a vehicle occupant through the mirror 84.

Here, the mirror 84 is constructed by a half mirror, an infrared ray transmitting filter, or the like. As the result, the monitoring device 86 can photograph a status of the vehicle occupant through the mirror 84. That is, the monitoring device 86 can monitor the vehicle occupant.

However, in the inner mirror device for a vehicle 80 mentioned above, rigidity of the PCB 88 is low, further, a position at which the device main body 90 is fixed to the PCB 88 (the central portion of the PCB 88) is apart from positions at which the housing 82 is fixed to the PCB 88 (the end portions of the PCB 88). Further, a distance between a position at which the PCB 88 is fixed to the device main body 90 (the base end of the device main body 90) and the lens 92 (the tip end of the device main body 90) is large.

Accordingly, in a case in which vibration of the vehicle is transmitted to the hosing 82 (especially, in a case in which the monitoring device 86 resonates), the lens 92 vibrates with respect to the housing 82 by large amplitude. That is, there is a problem in which an image photographed by the monitoring device 86 is not stable due to the vibration.

SUMMARY OF THE INVENTION

The present invention was developed in consideration of the above mentioned fact, and an object of the present invention is to provide a mirror device for a vehicle in which an image photographed by a monitoring mechanism can be stable even in a case in which vibration of a vehicle is transmitted to a housing.

A first aspect of the present invention is a mirror device for a vehicle comprising a housing, provided at a vehicle, which holds a mirror and covers a back surface side of the mirror, a photographing mechanism, provided within the housing, which has a lens and photographs a status in a direction in which the lens is oriented, and a fixing member, fixed to one of the housing or the mirror, which fixes one of the lens or the vicinity of the lens of the photographing mechanism.

In a second aspect of the present invention according to the first aspect, a crushable portion is provided at one of the photographing mechanism and the fixing member, the fixing member fixing the photographing mechanism in a state in which the crushable portion is crushed (deformed) by the other of the photographing mechanism and the fixing member.

In a third aspect of the present invention according to the first aspect, the fixing member fixes the photographing mechanism due to the fixing member and the photographing mechanism being fastened by means of a fastening member.

In a fourth aspect of the present invention according to the first aspect, the fixing member fixes the photographing mechanism due to the fixing member and the photographing mechanism being fitted without clearance therebetween.

In a fifth aspect of the present invention according to the first aspect, one end side of the fixing member is fixed to the housing, and the other end side of the fixing member fixes the one of the lens or the vicinity of the lens of the photographing mechanism.

In a sixth aspect of the present invention according to the fifth aspect, a fitting hole is formed at the other end side of the fixing member.

In a seventh aspect of the present invention according to the sixth aspect, the one of the lens or the vicinity of the lens of the photographing mechanism is fitted into the fitting hole without clearance therebetween.

In an eighth aspect of the present invention according to the fifth aspect, the photographing mechanism is provided on a plate member, and the one end side of the fixing member is fixed to the housing together with the plate member.

In a ninth aspect of the present invention according to the first aspect, a fitting hole, into which the one of the lens or the vicinity of the lens of the photographing mechanism is fitted, is formed at the fixing member, at least one photographing mechanism fitting portion of a predetermined number is formed at the one of the lens and the vicinity of the lens of the photographing mechanism, and at least one fixing member fitting portion of the predetermined number, for fitting to the photographing mechanism fitting portion, is formed at the fitting hole.

In a tenth aspect of the present invention according to the ninth aspect, a crushable portion is provided at one of the photographing mechanism fitting portion or the fixing member fitting portion, the fixing member fixing the photographing mechanism in a state in which the crushable portion is crushed by the other of the photographing mechanism fitting portion and the fixing member fitting portion.

In an eleventh aspect of the present invention according to the first aspect, a fixing plate is fixed to one of the lens and the vicinity of the lens of the photographing mechanism, and the fixing member fixes the fixing plate.

In a twelfth aspect of the present invention according to the eleventh aspect, the fixing plate is fastened to the fixing member by means of a fastening member.

In a thirteenth aspect of the present invention according to the first aspect, one end side of the fixing member is fixed to the housing, and the other end side of the fixing member fixes a fixing plate fixed to the one of the lens and the vicinity of the lens of the photographing mechanism.

In a fourteenth aspect of the present invention according to the thirteenth aspect, the other end side of the fixing member and the fixing plate are fastened by means of a fastening member.

In a fifteenth aspect of the present invention according to the thirteenth aspect, the photographing mechanism is provided on a plate member, and the one end side of the fixing member is fixed to the housing together with the plate member.

In the mirror device for a vehicle of the first aspect of the present invention, the photographing mechanism is provided within the housing which holds the mirror and covers the back surface side of the mirror. The photographing mechanism photographs the status in the direction in which the lens is oriented.

Here, the fixing member, which is integrated with one of the housing or the mirror, fixes one of the lens or the vicinity of the lens of the photographing mechanism. Therefore, even in a case in which vibration of the vehicle is transmitted to the hosing (especially, even in a case in which the photographing mechanism resonates), amplitude of vibration the lens with respect to the housing can be minimized. Accordingly, an image photographed by the photographing mechanism can be stable.

In the mirror device for a vehicle of the second aspect according to the first aspect of the present invention, the fixing member fixes the photographing mechanism in a state in which the crushable portion provided at one of the photographing mechanism or the fixing member is crushed by the other of the photographing mechanism or the fixing member. Therefore, the of vibration the lens with respect to the fixing member can be prevented certainly. Accordingly, an image photographed by the photographing mechanism can be stable certainly.

In the mirror device for a vehicle according to the first aspect of the present invention, the fixing member fixes the photographing mechanism by the fixing member and the photographing mechanism being fastening by the fastening member. Therefore, the of vibration the lens with respect to the fixing member can be prevented certainly. Accordingly, an image photographed by the photographing mechanism can be stable certainly.

In the mirror device for a vehicle according to the first aspect of the present invention, the fixing member fixes the photographing mechanism by the fixing member and the photographing mechanism being fitted without clearance therebetween. Therefore, the of vibration the lens with respect to the fixing member can be prevented certainly. Accordingly, an image photographed by the photographing mechanism can be stable certainly.

In the mirror device for a vehicle of the fifth, sixth, seventh and eighth aspects of the present invention, the one end side of the fixing member is fixed to the housing, and the other end side of the fixing member fixes the one of the lens or the vicinity of the lens of the photographing mechanism. Preferably, the fitting hole is formed on the other end side of the fixing member, the fitting hole fixes the one of the lens or the vicinity of the lens of the photographing mechanism without clearance therebetween, and/or the one end side of the fixing member is fixed to the housing together with the plate member. Therefore, the of vibration the lens with respect to the fixing member can be prevented certainly. Accordingly, an image photographed by the photographing mechanism can be stable certainly.

In the mirror device for a vehicle of the ninth and the tenth aspects of the present invention, the photographing mechanism fitting portion (one or more) is formed at the one of the lens or the vicinity of the lens of the photographing mechanism, and the fixing member fitting portion (one of more), fitting to the photographing mechanism fitting portion, is formed at the fitting hole. Preferably, the crushable portion is provided at one of the photographing mechanism fitting portion or the fixing member fitting portion, and the fixing member fixes the photographing mechanism in a state in which the crushable portion is crushed by the other of the photographing mechanism fitting portion or the fixing member fitting portion. Therefore, the of vibration the lens with respect to the fixing member can be prevented certainly. Accordingly, an image photographed by the photographing mechanism can be stable certainly.

In the mirror device for a vehicle of the eleventh, twelfth, thirteenth, fourteenth and fifteenth aspects of the present invention, the fixing plate is fixed to one of the lens or the vicinity of the lens of the photographing mechanism, and the fixing plate is fixed to the fixing member. Preferably, the fixing member and the fixing plate are fastened by the fastening member (preferably, a screw). Therefore, the of vibration the lens with respect to the fixing member can be prevented certainly. Accordingly, an image photographed by the photographing mechanism can be stable certainly.

BRIEF DESCRIPTION OF THE DRAWINGS

FIG. 6 is a cross sectional view illustrating a monitoring device and neighborhood of the monitoring device in a conventional inner mirror device for a vehicle.

DETAILED DESCRIPTION OF THE INVENTION

Referring to drawings, an embodiment of the present invention will be described hereinafter in detail.

Figure 1:
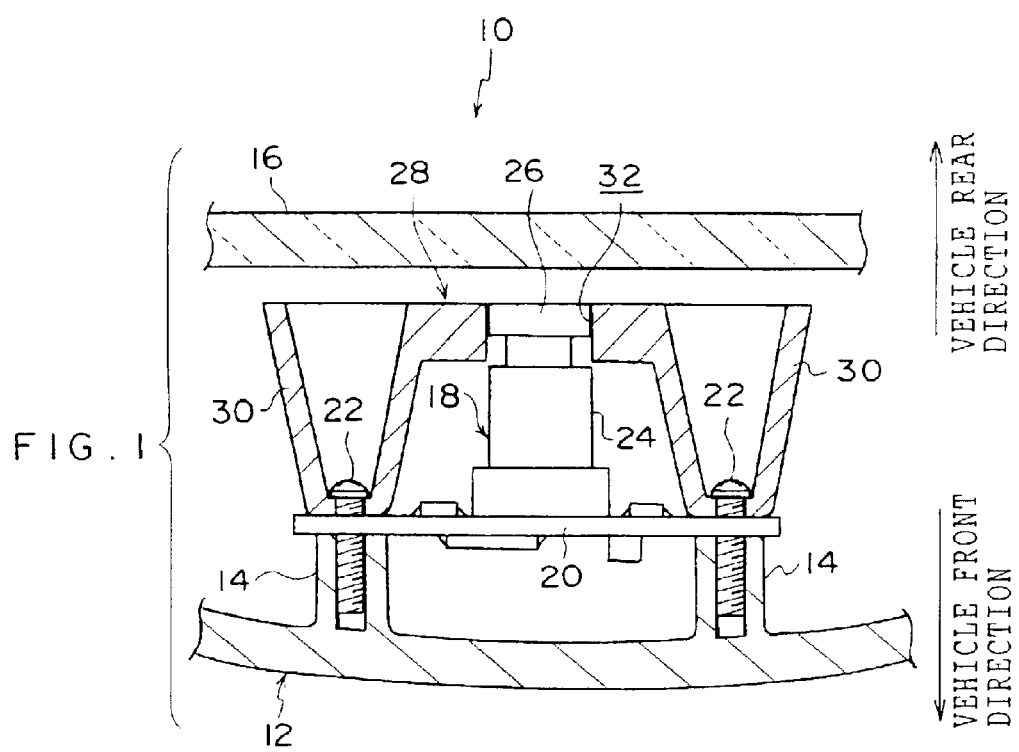
FIG. 1 is a cross sectional view illustrating a monitoring device and neighborhood of the monitoring device in an inner mirror device for a vehicle in an embodiment of the present invention.
Figure 2:
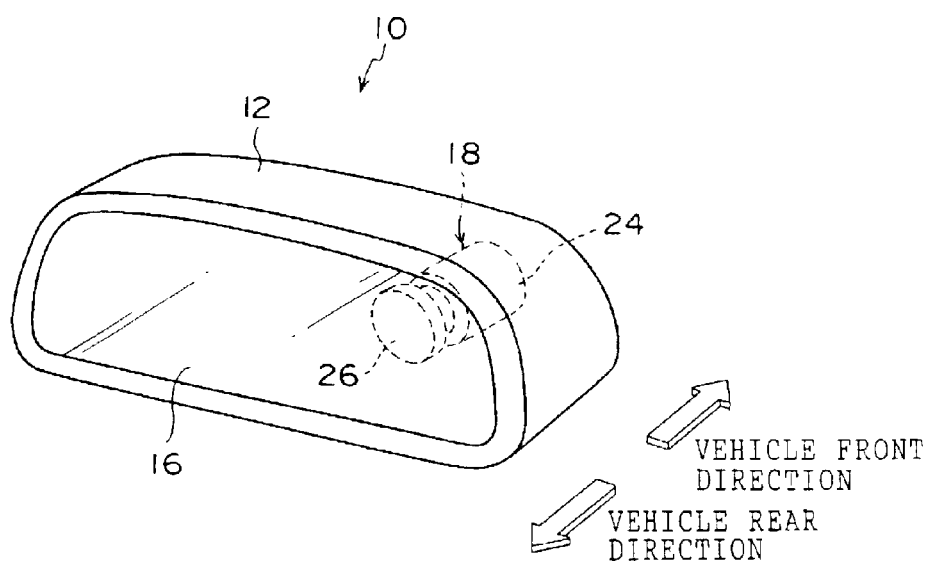
FIG. 2 is a perspective view illustrating the inner mirror device for a vehicle relating to the embodiment of the present invention.

FIG. 1 is a cross sectional view illustrating main portions of an inner mirror device for a vehicle 10 constructed by applying the present invention and relating to the present embodiment. FIG. 2 is a perspective view illustrating the inner mirror device for a vehicle 10 relating to the embodiment of the present invention.

The inner mirror device for a vehicle 10 relating to the embodiment of the present invention is provided with a housing 12. The housing 12 is supported at a ceiling (not shown in the drawings) in a vehicle compartment. Further, the housing 12 is substantially hollow structure, and vehicle rear side of the housing 12 is open. That is, an opening is formed at the vehicle rear side of the housing 12. Within the housing 12, cylinder shaped fixing tubes 14 of predetermined numbers are formed integrally at a vehicle front side wall of the housing 12. Each fixing tube 14 protrudes toward vehicle rear side.

The housing 12 holds a mirror 16 for visualizing rearward at the opening. Back surface side of the mirror 16 is covered by the housing 12. The mirror 16 is constructed by a half mirror, an infrared ray transmitting filter, or the like. As the result, a status of a front surface side of the mirror 16 can be checked from the back surface side of the mirror 16 through the mirror 16 (that is, a status in the vehicle rear direction can be checked).

A monitoring device 18 as a photographing mechanism (for example, a camera) is provided within the housing 12. The monitoring device 18 has a plate shaped PCB (a print circuit board) 20. Components necessary for the monitoring device 18 (an electric circuit and the like) are mounted on the PCB 20. The PCB 20 is fixed to the housing 12 due to that end portions of the PCB 20 are fastened (screwed) to the respective fixing tubes 14 by means of respective screws 22.

A base end of a substantially pillar shaped device main body 24 of the monitoring device 18 is fixed to a central portion of the PCB 20. A disc shaped lens 26 is provided at a tip end of the device main body 24. The lens 92 is oriented toward a vehicle occupant through the mirror 16.

Here, as mentioned above, the status of the front surface side of the mirror 16 can be checked from the back surface side of the mirror 16 through the mirror 16. As the result, the monitoring device 18 can photograph a status of the vehicle occupant through the mirror 16. That is, the monitoring device 18 can photograph a status in a direction in which the mirror 16 is oriented. Accordingly, the monitoring device 18 can monitor the vehicle occupant.

A bracket 28 as a fixing member is provided within the housing 12. The bracket 28 is a substantially plate configuration having a predetermined thickness. Concave portions 30 of predetermined numbers are formed at end portions of the bracket 28. Each concave portion 30 extends toward the PCB 20. The bracket 28 is integrally fixed to the housing 12 due to that bottom wall portions of the respective concave portion 30 are fastened (screwed) to the respective fixing tubes 14 together with the PCB 20 by means of the respective screws 22.

A fitting hole 32 is formed at a central portion of the bracket 28. The fitting hole 32 is a penetration hole having a circular shape in a plane view. The lens 26 of the monitoring device 18 is fixed to the bracket 28 (the bracket 28 fixes the lens 26) in such a manner that the lens 26 of the monitoring device 18 is fitted to the fitting hole 32 without clearance therebetween.

Next, an operation of the inner mirror device for a vehicle of the present embodiment will be described.

In the inner mirror device for a vehicle 10 having the structure mention above, the monitoring device 18 is provided within the housing 12 which covers the back surface side of the mirror 16 and holds the mirror 16. The monitoring device 18 can photograph a status of the vehicle occupant through the mirror 16.

Here, the bracket 28 is fixed to the housing 12 due to that each concave portion 30 of the bracket 28 is fasten to the respective fixing tubes 14 of the housing 12 by means of the respective screws 22. As the result, the bracket 28 is integrated with the housing 12 via each of the screws 22. Further, the lens 26 of the monitoring device 18 is fixed to the bracket 28 (the bracket 28 fixes the lens 26) in such a manner that the lens 26 of the monitoring device 18 is fitted to the fitting hole 32 of the bracket 28.

Therefore, even in a case in which vibration of the vehicle is transmitted to the hosing 12 (especially, even in a case in which the monitoring device 18 resonates), amplitude of vibration the lens 26 with respect to the housing 12 can be minimized. Accordingly, an image photographed by the monitoring device 18 can be stable.

Further, the lens 26 of the monitoring device 18 is fixed to the bracket 28 (the bracket 28 fixes the lens 26) in such a manner that the lens 26 of the monitoring device 18 is fitted to the fitting hole 32 of the bracket 28 without clearance therebetween. Therefore, the vibration the lens 26 with respect to the bracket 28 can be prevented certainly. Accordingly, an image photographed by the monitoring device 18 can be stable certainly.

In the present embodiment, the bracket 28 is fixed to the housing 12 together with the PCB 20 by fastening (screwing) by use of each screw 22. However, the present invention is not limited to the same. The bracket (the fixing member) can be directly fixed to the housing by fastening (screwing) by use of a screw or the like.

Further, in the present embodiment, the bracket 28 is fixed to the housing 12. However, the present invention is not limited to the same. The bracket (the fixing member) can be fixed to the mirror.

Further, in the present embodiment, the lens 26 of the monitoring device 18 is fixed to the bracket 28 (the bracket 28 fixes the lens 26) by fitting without clearance therebetween. However, the present invention is not limited to the same. A portion, which is in the vicinity of the lens, of the monitoring device (the photographing mechanism) can be fixed to the bracket (the fixing member) by fitting without clearance therebetween (the bracket 28 can fix the vicinity of the lens 26 without clearance therebetween).

(A First Modified Example of the Embodiment)

Figure 3:
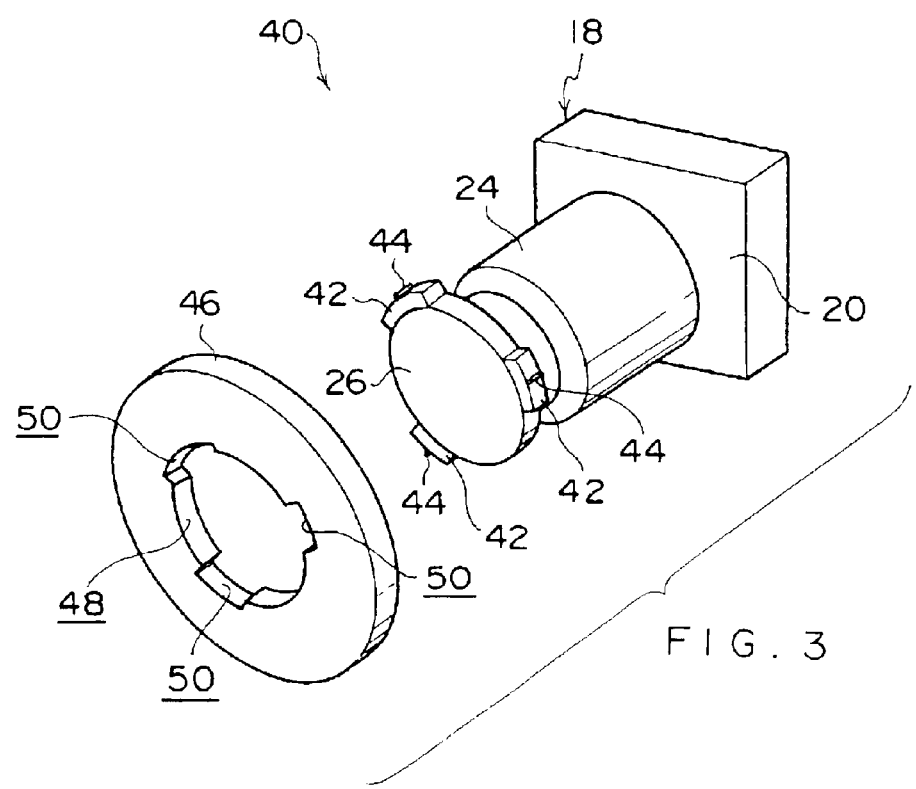
FIG. 3 is an exploded perspective view illustrating a monitoring device and a bracket in an inner mirror device for a vehicle in a first modified example of the embodiment of the present invention.

FIG. 3 is an exploded perspective view (an perspective view before assembling) illustrating main portions of an inner mirror device for a vehicle 40 relating to the first modified example of the embodiment of the present invention.

In the inner mirror device for a vehicle 40 relating to the first modified example, inserting protrusions 42 of predetermined numbers are formed integrally on a peripheral surface of the lens 26 of the monitoring device 18 (in the first modified example, three inserting protrusions 42 are formed on the peripheral surface of the lens 26 with the same interval therebetween in a peripheral direction of the lens 26). The inserting protrusion 42 is a curved square pole configuration. A thin plate shaped crushable-rib 44, as a crushable portion (a portion to be crushed), is formed integrally on each central portion of a peripheral surface (which is substantially parallel to the peripheral surface of the lens 26) of the inserting protrusions 42.

A bracket 46 as a fixing member is provided within the housing 12. The bracket 46 is a substantially disc configuration having a predetermined thickness. The bracket 46 is fixed to the housing 12 or the mirror 16 indirectly or directly. As the result, the bracket 46 is integrated with the housing 12 or the mirror 16.

A fitting hole 48 is formed in a central portion of the bracket 46. The fitting hole 48 is a penetration hole having a substantially circular shape in a plane view. Inserted holes 50 of predetermined numbers are formed integrally on a peripheral surface of the fitting hole 48 (in the first modified example, three inserted holes 50 are formed on the peripheral surface of the fitting hole 48 with the same interval therebetween in a peripheral direction of the fitting hole 48). The inserted hole 50 has a configuration corresponding to the curved square pole configuration.

Here, when the lens 26 is fitted into the fitting hole 48, each inserting protrusion 42 is inserted in the respective inserted holes 50 in a state in which each crushable-rib 44 is crushed by respective peripheral walls of the inserted holes 50. As the result, the lens 26 is fixed to the bracket 46 (the bracket 46 fixes the lens 26). Therefore, in the first modified example, the vibration the lens 26 with respect to the bracket 46 can be prevented certainly. Accordingly, an image photographed by the monitoring device 18 can be stable certainly.

In the first modified example, the crushable-ribs 44 are provided at the monitoring device side (the lens 26). However, the present invention is not limited to the same. Crushable-ribs (crushable portions) can be provided at, for example, the respective peripheral walls of the inserted holes of the bracket (the fixing member).

Further, in the first modified example, the lens 26 of the monitoring device 18 is fixed to the bracket 46 (the bracket 46 fixes the lens 26) in the state in which the crushable-ribs 44 are crushed. However, the present invention is not limited to the same. A portion, which is in the vicinity of the lens, of the monitoring device (the photographing mechanism) can be fixed to the bracket (the fixing member) in the state in which the crushable-ribs (the crushable portions) are crushed (the bracket 46 can fix the vicinity of the lens 26).

(A Second Modified Example of the Embodiment)

Figure 4:
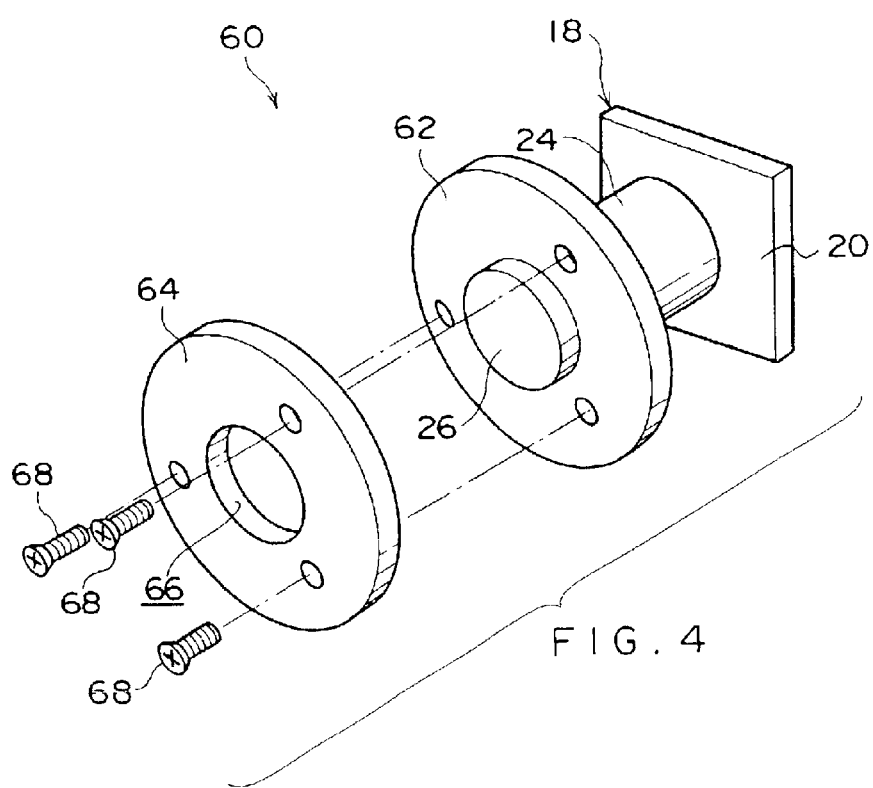
FIG. 4 is an exploded perspective view illustrating a monitoring device and a bracket in an inner mirror device for a vehicle in a second modified example of the embodiment of the present invention.

FIG. 4 is an exploded perspective view illustrating main portions of an inner mirror device for a vehicle 60 relating to the second modified example of the embodiment of the present invention.

In the inner mirror device for a vehicle 60 relating to the second modified example, a disc (s ring) shaped fixing board 62 is provided integrally at the monitoring device 18 adjacent to the lens 26.

A bracket 64 as the fixing member is provided within the housing 12. The bracket 64 has a substantially disc configuration having a predetermined thickness. The bracket 64 is fixed to the housing 12 or the mirror 16 indirectly or directly. As the result, the bracket 64 is integrated with the housing 12 or the mirror 16. A fitting hole 66 is formed in a central portion of the bracket 64. The fitting hole 66 is a penetration hole having a substantially circular shape in a plane view.

Here, in a state in which the lens 26 is fitted into the fitting hole 66, the fixing board 62 and the bracket 64 are fastened by means of screws 68 such that the screws 68 of predetermined numbers (in the second modified embodiment, three) are screwed at predetermined positions (in the second modified embodiment, intervals between adjacent positions in a circumference direction are the same). As the result, the vicinity of the lens 26 (the fixing board 62) of the monitoring device 18 is fixed to the bracket 64 (the bracket 64 fixes the vicinity of the lens 26). As the result, in the second modified example, the vibration of the lens 26 with respect to the bracket 64 can be prevented certainly. Accordingly, an image photographed by the monitoring device 18 can be stable certainly.

In the second modified example, the bracket 64 fixes the vicinity of the lens 26 (the fixing board 62) of the monitoring device 18 by fastening (screwing). However, the present invention is not limited to the same. The bracket (the fixing member) can fix the lens 26 of the monitoring device (the photographing mechanism) by fastening (screwing).

(A Third Modified Example of the Embodiment)

Figure 5:
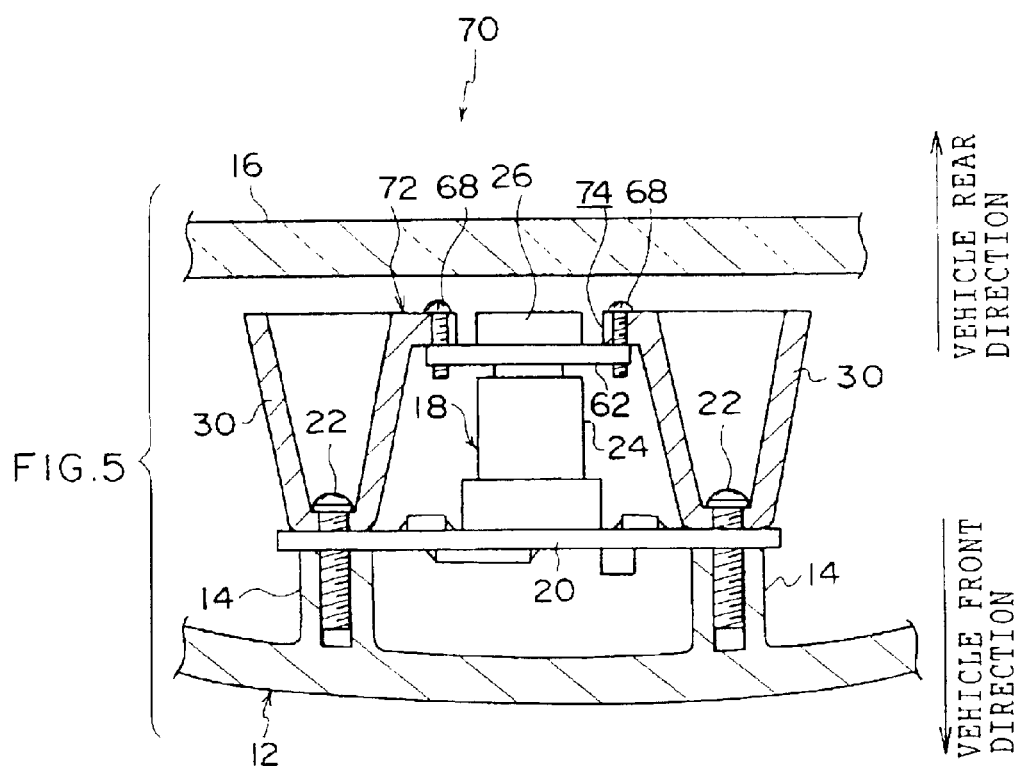
FIG. 5 is a cross sectional view illustrating a monitoring device and neighborhood of the monitoring device in an inner mirror device for a vehicle in a third modified example of the embodiment of the present invention.

FIG. 5 is a cross sectional view illustrating main portions of an inner mirror device for a vehicle 70 relating to the third modified example of the embodiment of the present invention.

In the inner mirror device for a vehicle 70 relating to the third modified example, similar to the second modified example mentioned above, the disc shaped fixing board 62 is provided integrally at the monitoring device 18 adjacent to the lens 26.

A bracket 72 as the fixing member is provided within the housing 12. Similar to the first modified example mentioned above, the concave portions 30 of predetermined numbers are formed at end portions of the bracket 72. Each concave portion 30 extends toward the PCB 20. The bracket 72 is integrally fixed to the housing 12 due to that bottom wall portions of each of the concave portions 30 are fastened (screwing) to the respective fixing tubes 14 together with the PCB 20 by means of the respective screws 22. A penetrating hole 74 is formed at a central portion of the bracket 72.

Here, similar to the second embodiment mentioned above, the fixing board 62 and the bracket 72 are fastened by means of the screws 68 such that the screws 68 of predetermined numbers are screwed at predetermined positions (in the third modified embodiment, intervals between adjacent positions in a circumference direction are the same) in a state in which the lens 26 is inserted into the penetrating hole 74. As the result, the vicinity of the lens 26 of the monitoring device 18 (the fixing board 62) is fixed to the bracket 72 (the bracket 72 fixes the vicinity of the lens 26). Therefore, in the third modified example, the vibration of the lens 26 with respect to the bracket 72 can be prevented certainly. Accordingly, an image photographed by the monitoring device 18 can be stable certainly.

In the third modified example, the bracket 72 is fixed to the housing 12 together with the PCB 20 by fastening by use of the respective screws 22. However, the present invention is not limited to the same. The bracket (the fixing member) can be directly fixed to the housing by fastening by use of screws or the like.

Further, in the third modified example, the bracket 72 is fixed to the housing 12. However, the present invention is not limited to the same. The bracket (the fixing member) can be fixed to the mirror.

Further, in the third modified example, the vicinity of the lens 26 of the monitoring device 18 (the fixing board 62) is fixed by the bracket 72 by fastening (screwing). However, the present invention is not limited to the same. The bracket (the fixing member) can fix the lens 26 of the monitoring device (the photographing mechanism) by fastening (screwing).

Further, in the present embodiment (including the first, the second and the third modified examples), the monitoring device 18 photographs a status of the vehicle occupant through the mirror 16 due to the structure in that the lens 26 of the monitoring device 18 is oriented toward the vehicle occupant (that is, the monitoring device 18 is a type of a vehicle occupant monitoring device). However, the present invention is not limited to the same. The lens 26 of the monitoring device (the photographing mechanism) can be oriented toward any directions. For example, the lens of the monitoring device (the photographing mechanism) can be oriented toward a vehicle front direction. That is, the monitoring device can be a type of a forward status monitoring device. In a case in which the lens of the monitoring device is oriented toward a side opposite the mirror side, a status outside the housing can be checked from inside of the housing through the housing due to the structure in which at least a portion of the housing which faces the lens is constructed by a transparence member, a half mirror or an infrared ray transmitting filter, or the like.

Further, in the present embodiment (including the first, the second and the third modified examples), the present invention is applied to the inner mirror devices for a vehicle 10, 40, 60, 70. However, the present invention is not limited to the same. The present invention can be applied to an outer mirror device for a vehicle (a door mirror device for a vehicle, a fender mirror device for a vehicle).

In the mirror device for a vehicle of the first aspect of the present invention, the fixing member fixes one of the lens or the vicinity of the lens of the photographing mechanism. Therefore, even in a case in which vibration of the vehicle is transmitted to the hosing, amplitude of vibration the lens with respect to the housing can be minimized. Accordingly, an image photographed by the photographing mechanism can be stable.

In the mirror device for a vehicle of the second aspect according to the first aspect of the present invention, the fixing member fixes the photographing mechanism in a state in which the crushable portion is crushed. Therefore, the vibration the lens with respect to the fixing member can be prevented certainly. Accordingly, an image photographed by the photographing mechanism can be stable certainly.

In the mirror device for a vehicle of the third aspect according to the first aspect of the present invention, the fixing member fixes the photographing mechanism by the fixing member and the photographing mechanism being fastening by the fastening member. Therefore, the of vibration the lens with respect to the fixing member can be prevented certainly. Accordingly, an image photographed by the photographing mechanism can be stable certainly.

In the mirror device for a vehicle of the fourth aspect according to the first aspect of the present invention, the fixing member fixes the photographing mechanism by the fixing member and the photographing mechanism being fitted without clearance therebetween. Therefore, the of vibration the lens with respect to the fixing member can be prevented certainly. Accordingly, an image photographed by the photographing mechanism can be stable certainly.

What is claimed is:

1. A mirror device for a vehicle comprising:
    a housing, provided at a vehicle, which holds a semi-transmissive mirror and covers a back surface side of the mirror;
    a photographing mechanism, provided within the housing, which has a lens at one end adjacent to the mirror, and a back end opposite said lens, and photographs a status in a direction through the mirror in which the lens is oriented; and
    a fixing member having opposing end oriented along a vehicle longitudinal direction, one end being directly fixed to a portion of the housing adjacent to said back end, and the opposite end including a fitting hole which fixes one of the lens or the vicinity of the lens of the photographing mechanism.

2. The mirror device for a vehicle of claim 1, wherein a crushable portion is provided at one of the photographing mechanism and the fixing member, the fixing member fixing the photographing mechanism in a state in which the crushable portion is crushed by the other of the photographing mechanism and the fixing member.

3. The mirror device for a vehicle of claim 1, wherein the fixing member fixes the photographing mechanism due to the fixing member and the photographing mechanism being fastened by means of a fastening member.

4. The mirror device for a vehicle of claim 1, wherein the fixing member fixes the photographing mechanism due to the fixing member and the photographing mechanism being fitted without clearance therebetween.

5. The mirror device for a vehicle of claim 1, wherein the one of the lens or the vicinity of the lens of the photographing mechanism is fitted into the fitting hole without clearance therebetween.

6. The mirror device for a vehicle of claim 1, wherein the back end of the photographing mechanism is provided on a plate member, and the one end of the fixing member is directly fixed to the housing together with the plate member.

7. The mirror device for a vehicle of claim 1, wherein:
    at least one photographing mechanism fitting portion of a predetermined number is formed at the one of the lens and the vicinity of the lens of the photographing mechanism; and
    at least one fixing member fitting portion of the predetermined number, for fitting to the photographing mechanism fitting portion, is formed at the fitting hole.

8. The mirror device for a vehicle of claim 7, wherein a crushable portion is provided at one of the photographing mechanism fitting portion or the fixing member fitting portion, the fixing member fixing the photographing mechanism in a state in which the crushable portion is crushed by the other of the photographing mechanism fitting portion and the fixing member fitting portion.

9. The mirror device for a vehicle of claim 1, wherein a fixing plate is fixed to one of the lens and the vicinity of the lens of the photographing mechanism, and the fixing member fixes the fixing plate.

10. The mirror device for a vehicle of claim 9, wherein the fixing plate is fastened to the fixing member by means of a fastening member.

11. The mirror device for a vehicle of claim 1, wherein one end side of the fixing member is directly fixed to the housing, and an opposite end side of the fixing member fixes a fixing plate fixed to the one of the lens and the vicinity of the lens of the photographing mechanism.

12. The mirror device for a vehicle of claim 11, wherein the opposite end side of the fixing member and the fixing plate are fastened by means of a fastening member.

13. The mirror device for a vehicle of claim 11, wherein the back end of the photographing mechanism is provided on a plate member, and the one end side of the fixing member is fixed to the housing together with the plate member.

14. A mirror device for a vehicle comprising:
    a housing, provided at a vehicle, which holds a semi-transmissive mirror and covers a back surface side of the mirror;
    a photographing mechanism, provided within the housing, which has a lens at one end adjacent to the mirror, and photographs a status in a direction in which the lens is oriented; and
    a fixing member, fixed to the mirror, and having a fitting hole which fixes one of the lens or the vicinity of the lens of the photographing mechanism.

* * * * *

UNITED STATES PATENT AND TRADEMARK OFFICE
CERTIFICATE OF CORRECTION

PATENT NO. : 6,961,195 B2 Page 1 of 1
APPLICATION NO. : 10/456502
DATED : November 1, 2005
INVENTOR(S) : Bunji Inagaki It is certified that error appears in the above-identified patent and that said Letters Patent is hereby corrected as shown below:

On Title Page, Col. 1
Item (73) "Kabushiki Kaisha Tokai-Rika-Kenki-Seisakusho" should read
-- Kabushiki Kaisha Tokai-Rika-_D_enki-Seisakusho --.

Signed and Sealed this

Twenty-second Day of August, 2006

JON W. DUDAS
*Director of the United States Patent and Trademark Office*